(12) United States Patent
Bergquist et al.

(10) Patent No.: US 9,002,361 B2
(45) Date of Patent: Apr. 7, 2015

(54) TELECOMMUNICATIONS HANDOVER WHEN HANDOVER RESTRICTION LIST IS MISSING

(75) Inventors: Gunnar Bergquist, Kista (SE); Christian Axell, Mjölby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 13/180,279

(22) Filed: Jul. 11, 2011

(65) Prior Publication Data
US 2013/0017826 A1    Jan. 17, 2013

(51) Int. Cl.
| H04W 36/00 | (2009.01) |
| H04W 12/08 | (2009.01) |
| H04L 29/06 | (2006.01) |
| H04W 48/02 | (2009.01) |
| H04W 92/04 | (2009.01) |
| H04W 92/20 | (2009.01) |

(52) U.S. Cl.
CPC .......... *H04W 36/0066* (2013.01); *H04W 12/08* (2013.01); *H04W 36/0033* (2013.01); *H04W 48/02* (2013.01); *H04W 92/045* (2013.01); *H04W 92/20* (2013.01); *H04L 63/101* (2013.01)

(58) Field of Classification Search
USPC ............................ 455/436–444; 370/331–334
See application file for complete search history.

(56) References Cited

U.S. PATENT DOCUMENTS

| 2008/0125126 A1* | 5/2008 | Fang et al. ............... 455/436 |
| 2010/0157944 A1* | 6/2010 | Horn ...................... 370/331 |
| 2010/0261473 A1* | 10/2010 | Al-Bakri et al. ......... 455/435.2 |
| 2010/0267388 A1* | 10/2010 | Olsson .................... 455/436 |
| 2010/0279687 A1* | 11/2010 | Horn et al. ............... 455/435.1 |
| 2011/0116478 A1* | 5/2011 | Zhang et al. ............. 370/331 |
| 2011/0256855 A1* | 10/2011 | Wang ...................... 455/418 |
| 2012/0135709 A1* | 5/2012 | Deng et al. ............... 455/411 |

FOREIGN PATENT DOCUMENTS

WO    WO 2009083529 A1 *  7/2009

OTHER PUBLICATIONS

3GPP TS 23.401 V9.4.0 (Mar. 2010), "General Packet Radio Service (GPRS) enhancements for Evolved Universal Terrestrial Radio Access Network (E-UTRAN) access (Release 9)"; 3GPP Technical Specification, Mar. 2010, All pages.*

3GPP TS 36.413, V9.5.0, 3rd Generation Partnership Project; Technical Specification Group Radio Access; Network; Evolved Universal Terrestrial Radio Access Network (E-UTRAN); S1 Application Protocol (S1AP) (Release 9), Dec. 2010.

(Continued)

*Primary Examiner* — Allahyar Kasraian (57) ABSTRACT

A base station node ($26_S$) of a radio access network comprises a communication interface (62) to a higher layer network node (40) and a handover unit (50). The handover unit (50) is configured to request that the higher layer network node (40) make a decision regarding a target cell ($28_T$) to which to handover a particular wireless terminal (30) when the base station node does not have roaming configuration information for the particular wireless terminal and an attempted X2 interface handover of the particular wireless terminal has failed. The target cell ($28_T$) is of a type that is shared by plural public land mobile networks (42, 44).

12 Claims, 7 Drawing Sheets

(56) References Cited

OTHER PUBLICATIONS

3GPP TS 36.423, V10.0.0; 3rd Generation Partnership Project; Technical Specification Group Radio Access Network; Evolved Universal Terrestrial Radio Access Network (E-UTRAN); X2 application protocol (X2AP) (Release 10); Dec. 2010.

3GPP TS 23.251, V8.2.0; 3rd Generation Partnership Project; Technical Specification Group Services and System Aspects; Network Sharing; Architecture and Functional Description (Release 8); Mar. 2010.

3GPP TS 24.008, V10.1.0; 3rd Generation Partnership Project; Technical Specification Group Core Network and Terminals; Mobile Radio Interface Layer 3 Specification; Core Network Protocols; Stage 3 (Release 10); Dec. 2010.

3GPP TS 25.331, V9.4.0; 3rd Generation Partnership Project; Technical Specification Group Radio Access Network; Radio Resource Control (RRC); Protocol Specification (Release 10); Sep. 2010.

3GPP TS 36.331, V10.0.0; 3rd Generation Partnership Project; Technical Specification Group Radio Access Network; Evolved Universal Terrestrial Radio Access (E-UTRA); Radio Resource Control (RRC); Protocol Specification (Release 10); Dec. 2010.

International Search Report issued in International Application No. PCT/SE2012/050797 dated Dec. 14, 2012.

Written Opinion issued in International Application No. PCT/SE2012/050797 dated Dec. 14, 2012.

3GPP TS 23.401, "3$^{rd}$ Generation Partnership Project; Technical Specification Group Services and System Aspects; General Packet Radio Service (GPRS) Enhancements for Evolved Universal Terrestrial Radio Access Network (E-UTRAN) Access (Release 9)," V9.9.0 Jun. 2011.

3GPP TS 36.423, "3$^{rd}$ Generation Partnership Project; Technical Specification Group Radio Access Network; Evolved Universal Terrestrial Radio Access Network (E-UTRAN); X2 Application Protocol (X2AP) (Release 10)," V10.2.0 Jun. 2011.

\* cited by examiner

Fig. 7

TELECOMMUNICATIONS HANDOVER WHEN HANDOVER RESTRICTION LIST IS MISSING

TECHNICAL FIELD

This invention pertains to telecommunications, and particularly to handover of a wireless terminal from a source base station node to a target base station node.

BACKGROUND

In a typical cellular radio system, wireless terminals (also known as mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (UMTS) or "eNodeB" (LTE). A cell is a geographical area where radio coverage is provided by the radio base station equipment at a base station site. Each cell is identified by an identity within the local radio area, which is broadcast in the cell. Another identity identifying the cell uniquely in the whole mobile network is also broadcasted in the cell. The base stations communicate over the air interface operating on radio frequencies with the user equipment units (UE) within range of the base stations.

In some versions of the radio access network such as the third generation Universal Mobile Telecommunications System (UMTS), several base stations are typically connected (e.g., by landlines or microwave) to a controller node (such as a radio network controller (RNC) or a base station controller (BSC)) which supervises and coordinates various activities of the plural base stations connected thereto. The radio network controllers are typically connected to one or more core networks.

In a forum known as the Third Generation Partnership Project (3GPP), telecommunications suppliers propose and agree upon standards for third generation networks and UTRAN specifically, and investigate enhanced data rate and radio capacity. The $3^{rd}$ Generation Partnership Project (3GPP) has developed specifications for the Evolved Universal Terrestrial Radio Access Network (E-UTRAN). The Evolved Universal Terrestrial Radio Access Network (E-UTRAN) comprises the Long Term Evolution (LTE) and System Architecture Evolution (SAE). Long Term Evolution (LTE) is a variant of a 3GPP radio access technology wherein the radio base station nodes are connected to a core network (via Access Gateways, or AGWs) rather than to radio network controller (RNC) nodes. In general, in LTE the functions of a radio network controller (RNC) node are distributed between the radio base stations nodes (eNodeB's in LTE) and AGWs. As such, the radio access network (RAN) of an LTE system has an essentially "flat" architecture comprising radio base station nodes without reporting to radio network controller (RNC) nodes.

A component of the SAE architecture is the evolved packet core (EPC), also known as the SAE core. The EPC essentially serves as an equivalent of GPRS networks through a Mobility Management Entity (MME), a serving Gateway (SGW), and PDN Gateway subcomponents. The Non Access Stratum (NAS) signaling terminates at the MME and it is also responsible for generation and allocation of temporary identities to UEs. The MME protocol stack consists of (1) a S1-MME stack to support a S1-MME interface with eNodeB, and (2) a S11 stack to support S11 interface with Serving Gateway. The MME supports the S1 interface with eNodeB. The integrated S1 MME interface stack consists of IP, SCTP, S1AP The non-access stratum (NAS) protocols form the highest stratum of the control plane between the user equipment (UE) and MME. NAS protocols support the mobility of the UE and the session management procedures to establish and maintain IP connectivity between the UE and a packet data network gateway (PDN GW).

In cellular telecommunications, the term "handover" refers to the process of transferring an ongoing call or data session involving a wireless terminal from one node, channel, or radio access technology to another node, channel, or radio access technology. For example, a wireless terminal participating in an ongoing call or data session handled by a first or source base station may have the call or session handed over to a second or target base station when measurements from the wireless terminal indicate that it would be appropriate or beneficial for such handover to occur. However, in some instances a handover to a particular target base station or target cell may not be permitted, even if the measurements as reported by the wireless terminal seem to justify the handover. For example, the target cell may be ineligible for handover for the particular wireless terminal in view of subscription contract or subscriber agreement provisions, or other business reasons. In such sense a base station or cell may said to be "restricted" for handover purposes.

As understood from the foregoing, and interface known as the S1 interface exists between an eNodeB and a higher layer network entity such as a Mobility Management Entity (MME). Another interface, known as the X2 interface, is provided between an eNodeB and one or more neighboring eNodeB. As explained herein, some type of handovers (known as "X2 handovers") utilize the X2 interface, whereas other types of handovers (known as "S1 handovers") use the S1 interface.

A Handover Restriction List (HRL) is an information element which specifies one or more forbidden public land mobile networks (PLMN), one or more forbidden tracking areas (TA), one or more forbidden location areas (TA), and/or one or more other access restrictions (e.g., a forbidden inter-radio access technology (RAT)) for the wireless terminal. The standardized content of the Handover Restriction List is illustrated in Table 1. In Table 1, "M" means "mandatory" and "O" means "Optional".

Preferably the handover restriction list (HRL) is received at a base station node upon initial UE context setup The 3GPP standard specifies a number of procedures which can be used to send a Handover Restriction List (HRL) to a base station (BS), e.g., to an eNodeB. Example 3GPP messages that may optionally contain the Handover Restriction List IE are listed as follows:

S1AP: INITIAL CONTEXT SETUP REQUEST (to request the setup of a UE context)

S1AP: HANDOVER REQUEST (to request the preparation of resources)

S1AP: DOWNLINK NAS TRANSPORT (to carry NAS information over the S1 interface)

X2AP: HANDOVER REQUEST (to request the preparation of resources for a handover).

The Handover Restriction List information element (IE) is optionally provided to the eNodeB over the S1 interface by a Mobility Management Entity (MME) (see, e.g., reference [1]) or over the X2 interface by another eNodeB (see, e.g., reference [2]) and includes the serving public land mobile network (PLMN) and may contain equivalent PLMNs, and roaming area or access restrictions.

Upon receipt of the roaming configuration or HLR information for a user equipment unit, the eNodeB stores the received list in a UE context for the respective user equipment unit (UE). The UE context, stored in memory, comprises and/or holds subscriber information (downloaded, e.g., from a Home Subscriber Server [HSS]) as well as dynamic information such as a list of bearers that are established and capabilities of the wireless terminal. The eNodeB uses the information in a Handover Restriction List information element (IE) to determine a target cell for subsequent handover attempts. If the Handover Restriction List IE is not received, according to current convention the eNodeB considers that neither roaming area nor access restriction applies to the user equipment unit (UE).

The abovementioned standard specifications now mandate the eNodeB to reject an incoming request for handover request ($2^{nd}$ and $4^{th}$ bullets in above list of 3GPP messages) unless the eNodeB can determine the serving public land mobile network (PLMN). In particular, the specifications state:

S1: If the eNodeB receives a HANDOVER REQUEST message which does not contain the Handover Restriction List IE, and the serving PLMN cannot be determined otherwise by the eNodeB, the eNodeB shall reject the procedure using the HANDOVER FAILURE message. If the eNodeB receives a HANDOVER REQUEST message containing the Handover Restriction List IE, and the serving PLMN indicated is not supported by the target cell, the eNodeB shall reject the procedure using the HANDOVER FAILURE message.

X2: If the target eNodeB receives a HANDOVER REQUEST message which does not contain the Handover Restriction List IE, and the PLMN to be used cannot be determined otherwise, the target eNodeB shall reject the procedure using the HANDOVER PREPARATION FAILURE message. If the target eNodeB receives a HANDOVER REQUEST message containing the Handover Restriction List IE, and the serving PLMN is not supported by the target cell, the target eNodeB shall reject the procedure using the HANDOVER PREPARATION FAILURE message.

The references and specifications mentioned above speak of the Handover Restriction List (HRL) as being the enabler of handover restrictions in terms of forbidden tracking area identities (TAIs), location area identities (LAIs), and radio access technologies (RATs). Both the Tracking Area Identity (TAI) and location area identity (LAI) contain the public land mobile network (PLMN). But if the UE is forbidden in the PLMN, it is forbidden only locally in the tracking area or location area defined by the forbidden TAI and/or LAI.

The Handover Restriction List (HRL) also carries information which is to be interpreted as forbidden PLMNs. A forbidden public land mobile network (PLMN) is the opposite of an allowed public land mobile network (PLMN), which in turn is the sum of the serving public land mobile network (PLMN) and Equivalent public land mobile networks (PLMNs) as described by Table 1.

Usage of Tracking Area Identity (TAI), location area identity (LAI), and radio access technology (RAT) with respect to a Handover Restriction List (HRL) is relatively straightforward, since no cell which is the target for handover can support more than one of each. However, in the case of shared networks (see, e.g., reference [3]) the target cell can support several public land mobile networks (PLMNs) and there is a special meaning to/for the Handover Restriction List (HRL).

Use of the Handover Restriction List (HRL) and any associated behavior of the eNodeB which controls the target cell for the handover this fairly well established. Any base station node (e.g., eNodeB) which complies with the 3GPP standard and which is in control of a shared target cell must reject a request for handover unless the request message contains the HRL (and the PLMN to be used can not be determined otherwise by the base station note).

However, what is not described in the standard or otherwise prescribed is the relation between presence/absence of the Handover Restriction List (HRL) and any associated behavior of the eNodeB which initiates the handover, i.e., the source eNodeB which controls the source cell.

The 3GPP TS 36.413 cited as reference [1] states that "If the Handover Restriction List IE is not contained in the INITIAL CONTEXT SETUP REQUEST message, the eNodeB shall consider that neither roaming area nor access restriction applies to the UE". The problem with the 3GPP TS 36.413 and the existing solution is that the absence of HRL suggests that any public land mobile network (PLMN) is possible. This would only rarely be the desired behavior (except if connection is an IP Multimedia Subsystem (IMS) emergency call and/or one of the E-RABs has some particular ARP value"). Operators need much more deterministic ways to control the target public land mobile network (PLMN).

Thus, when the target cell is shared between two or more PLMNs, a problem may develop since the target eNodeB must have information on exactly what PLMN to use to enable the set up of logical connection through the core network. In case of an X2 interface handover, when the signaling for the handover is executed directly between the source and target eNodeB, the source eNodeB may decide on the PLMN to be used in the target cell and explicitly specify the PLMN in the Handover Request as sent to target eNodeB. But the only possibility for the source cell to select the proper PLMN in a target cell which is shared by multiple PLMNs is by knowledge of the proper PLMN from the handover restriction list (HRL). Lacking the handover restriction list (HRL) the source cell has no possibility of selecting PLMN in the target cell, and the target cell (when receiving the Handover Request) will likely reject the handover as lacking selected PLMN.

SUMMARY

In one of its aspects the technology described herein concerns a base station node of a radio access network. The base station note comprises a communication interface to a higher layer network node and a handover unit. The handover unit is configured to request that the higher layer network node make a decision regarding a target cell to which to handover a particular wireless terminal when the base station node does not have roaming configuration information for the particular wireless terminal and an attempted X2 interface handover of the particular wireless terminal has failed. The target cell is of a type that is shared by plural public land mobile networks.

In an example embodiment, the base station note further comprises a memory and a checker. The memory is configured to store UE contexts for plural user wireless terminals. The checker is configured to determine whether the memory has stored therein a handover restriction list for the particular user.

In an example embodiment the communication interface facilitates communication over an S1 interface with a core network and the handover unit is configured to request that a mobility management entity (MME) of the core network make the decision.

In an example embodiment the handover unit is comprised of electronic circuitry.

In another of its aspects the technology disclosed herein concerns a method of operating a communications network comprising a radio access network and a higher layer network. The radio access network comprises a source base station node. The method basically comprises: (1) determining a need of a handover for a particular wireless terminal from a cell served by the source base station to another cell; and (2) the source base station node requesting that a node of the higher layer network make a decision regarding a target cell to which to handover the particular wireless terminal when the source base station node does not have roaming configuration information for the particular wireless terminal and an attempted X2 interface handover of the particular wireless terminal has failed. The target cell is shared by plural public land mobile networks (PLMNs).

In an example embodiment and mode the method further comprises the source base station node determining that the source base station node does not have roaming configuration information for the particular wireless terminal; the source base station node requesting the X2 interface handover of the wireless terminal to the target cell; and, upon the source base station realizing that the X2 interface handover has failed, the base station requesting that the higher layer network node make the decision regarding the target cell.

In an example embodiment and mode the method further comprises the higher layer network node selecting one of the plural PLMNs for the target cell.

In an example embodiment and mode the method further comprises the higher layer network node providing the target station node for the target cell with a Handover Restriction List (HRL) for the particular wireless.

In an example embodiment and mode the method further comprises the higher layer network node performing S1 interface handover to the target cell.

In an example embodiment and mode the method further comprises the source base station node storing UE contexts for plural user wireless terminals in a memory; and the source base station node checking whether the memory has stored therein a handover restriction list for the particular user wireless terminal.

In an example embodiment and mode the method further comprises the source base station node requesting that a mobility management entity (MME) make the decision.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The roaming configuration associated with/to the wireless terminal (UE) may be provisioned to an eNodeB in various ways. For example, the roaming configuration associated with/to the wireless terminal (UE) may be provisioned to the eNodeB using the Handover Restriction List IE, the roaming configuration being received from either a Mobility Management Entity (MME) or by another eNodeB. The roaming configuration of the wireless terminal (UE) may be received by the source eNB from the Mobility Management Entity (MME) at context management or S1 handover signaling, or maybe received by the source eNB from another eNodeB at/by X2 handover signaling.

The existing standard supports inter-PLMN handover over the X2 interface. But the existing standard does not make a clearly specified association between the availability of HRL in the source eNodeB and whether any absence of the Handover Restriction List (HRL) should restrict the source eNB from administering the handover using the X2 interface. Nor does the existing standard require the source eNodeB, in absence of the Handover Restriction List (HRL), to initiate or at least partially administer the handover using the S1 interface, e.g., with the involvement of a Mobility Management Entity (MME).

In accordance with the technology disclosed herein, the source eNB, which administers handover to a shared target cell, involves a Mobility Management Entity (MME) when the source eNB has no access to the roaming configuration of the wireless terminal (UE) and an attempted handover fails. Without knowledge of the roaming configuration of the wireless terminal (UE), the eNodeB does not have enough evidence to properly select the public land mobile network (PLMN) for a shared target cell. Accordingly, should the handover fail, the source eNodeB instead delegates or forwards a handover decision (such as a target cell selection decision) to a higher level network, e.g., the eNodeB requests that higher level network select the PLMN of/for the target cell.

As described herein, a solution to the problem of the handover restriction list (HRL) being unknown to/lacking in the source cell when a handover should be made to a shared target cell involves the source cell initiating a S1 handover instead of an X2 handover when the attempted handover fails (because e.g., source eNodeB does not know which PLMN is to be used by the shared target cell). The S1 handover and the X2 handover are the two types of standardized handover, and while the X2 is performed with signaling directly between the source and target eNodeB, the S1 handover involves the core network in the signaling with the target eNodeB.

The technology disclosed herein initiates or requests a S1 handover when a Handover Restriction List (HRL) is missing at the source eNodeB and the handover fails, so that the selection of the PLMN in the target cell is transferred to the core network (e.g., a Mobility Management Entity (MME)) instead of being made in the source eNodeB. Thereby the Handover request may be accepted by the target eNodeB, and handover may be completed to a shared target cell even though and despite the fact the source cell lacks the Handover Restriction List (HRL).

Figure 1:
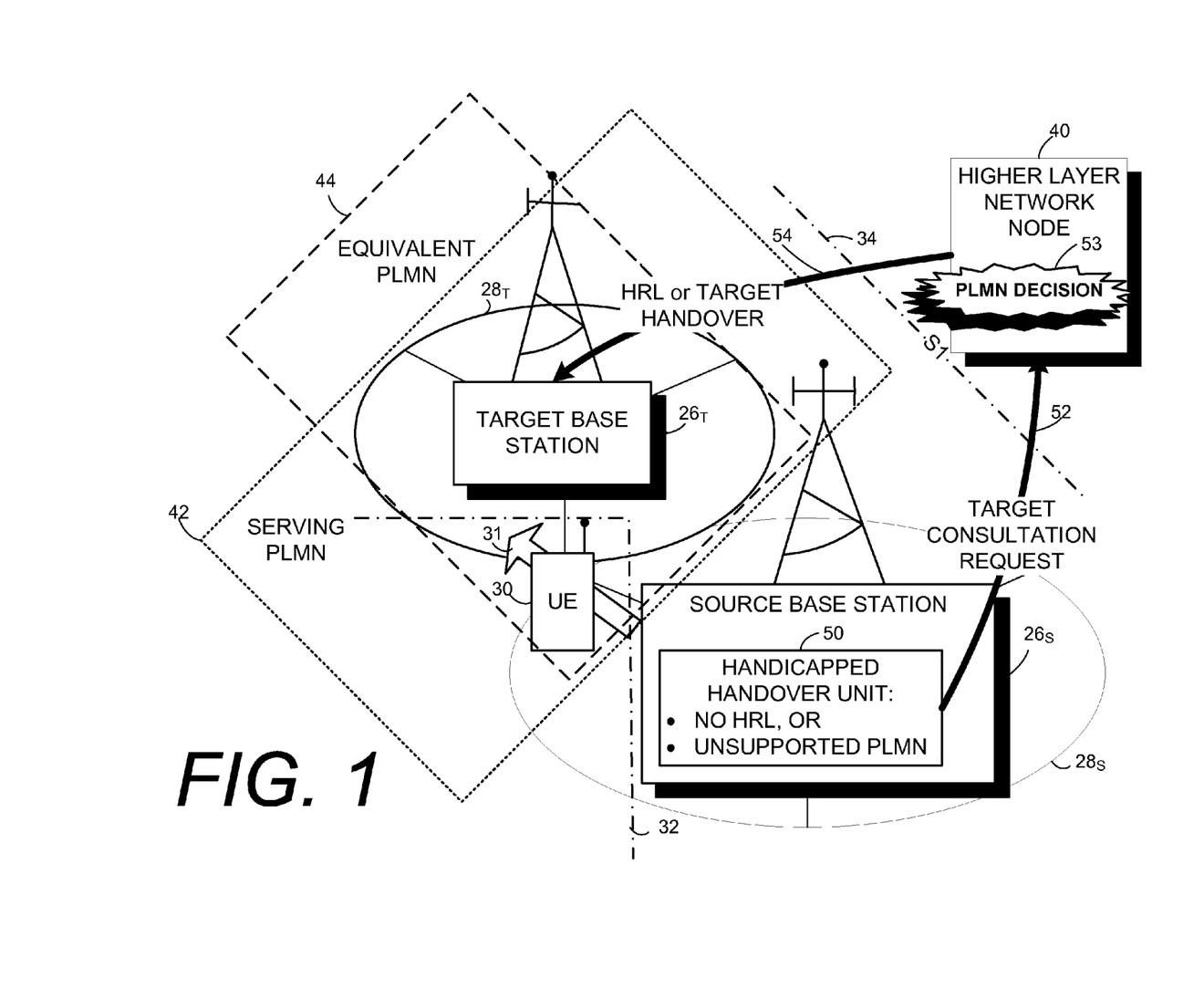
FIG. 1 is a diagrammatic view of portions of a telecommunications network according to an example, non-limiting embodiment.

FIG. 1 illustrates portions of an example telecommunications network, and particularly shows a source base station node $26_S$ which serves source cell $28_S$ and which communicates with a wireless terminal 30 over an air or radio interface 32. The source base station node $26_S$ is connected by an interface shown by dash-dotted line 34 to a higher layer network, and in FIG. 1 is particularly shown as being connected by the S1 interface to higher layer network node 40.

At the time shown in FIG. 1, as indicated by arrow 31 the wireless terminal 30 is moving toward another cell, e.g., cell $28_T$. Through measurement reports received from wireless terminal 30 the source cell $28_S$ or other network entity is discerning that it is time to perform a handover of wireless terminal 30 to another cell. Since cell $28_T$ may be a target cell for such handover, cell $28_T$ is also known as target cell $28_T$. The target cell $28_T$ is served by target base station node $26_T$. As shown in FIG. 1, target cell $28_T$ is shared by multiple public land mobile networks (PLMN), e.g., PLMN 42 which is denominated as the serving PLMN and PLMN 44 which is an equivalent PLMN.

As shown in FIG. 1, the source base station node $26_S$ comprises handover unit 50. Source base station node $26_S$ comprises many other functionalities and entities which are understood by the person skilled in the art and therefore not described herein. In view of the fact that, at certain times, handover unit 50 may not have sufficient information to by itself choose a usable target cell for a handover, the handover unit 50 is illustrated in FIG. 1 as a "handicapped" handover unit 50. As explained herein, the handover unit 50 may be handicapped if the handover unit 50 does not have access to a handover restriction list (HRL) for a wireless terminal needing handover. Alternatively, the handover unit 50 may be handicapped if, while having access to a handover restriction list (HRL) for the wireless terminal, the handover unit 50 contemplates a target cell but neither a serving public land mobile network (PLMN) nor an equivalent public land mobile network (PLMN) are supported in the target cell. This latter alternative has the result that a handover request to a shared target cell fails in view of, e.g., the source base station node's ignorance of a suitable PLMN for the shared target cell.

As further illustrated in FIG. 1, when faced with a handover (HO) in which it is handicapped, e.g., a handover which is failed, the handover unit 50 may send a target consultation request message 52 to the higher layer network node 40. In response to the target consultation request message 52, the higher layer network node 40 makes a handover decision, such as a PLMN selection decision 53 as depicted in FIG. 1. After the PLMN selection the higher layer network node 40 may provide a handover message 54 to the target base station node $26_T$. The handover message 54 may either include a handover restriction list (HRL) for the particular wireless terminal 30 which needs to be handed over to the target cell, or other information which enables or facilitates the handover (HO) by providing the target base station node $26_T$ with information suitable for the target base station node $26_T$ to discern a usable and workable target cell.

In an example embodiment the higher layer network node 40 may be a mobility management entity (MME). The mobility management entity (MME) is a control-node for a Long Term Evolution (LTE) access-network, and is generally responsible for idle mode UE (User Equipment) tracking and paging procedure including retransmissions. The mobility management entity (MME) is involved in the bearer activation/deactivation process and is also responsible for choosing the serving gateway (SGW) for a wireless terminal at the initial attach and at time of intra-LTE handover involving Core Network (CN) node relocation. The mobility management entity (MME) may also be responsible for authenticating the user (by interacting with the Home Subscriber Server [HSS]).

Figure 2:
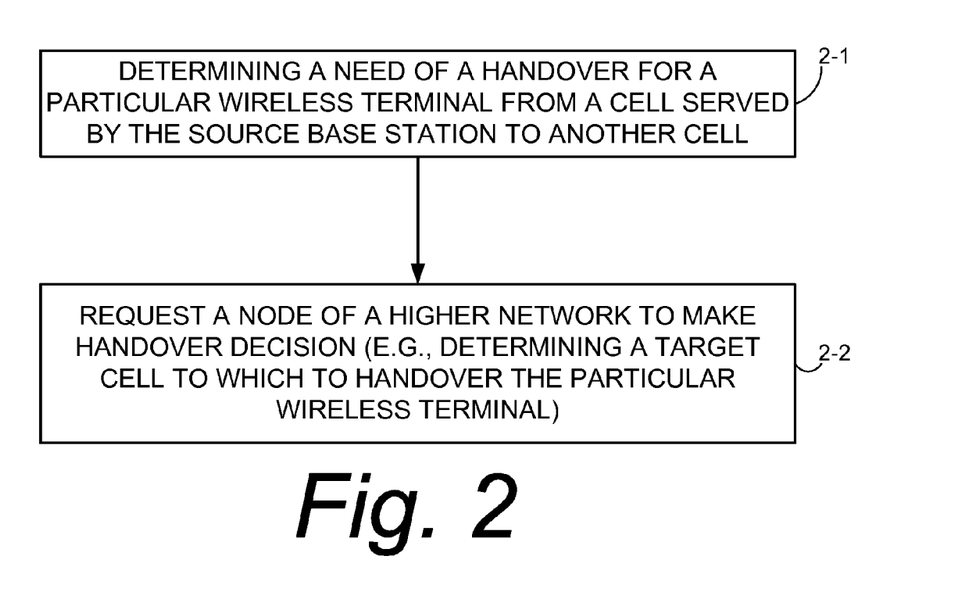
FIG. 2 is a flowchart showing basic, representative acts or steps comprising a method of operating a telecommunications network according to an example mode.

FIG. 2 illustrates basic, representative acts or steps comprising a method of operating a telecommunications network such as that of FIG. 1 according to an example mode. Act 2-1 comprises the network determining a need of handover for a particular wireless terminal (e.g., wireless terminal 30) from a cell served by the source base station (e.g., source cell $28_S$) to another cell. Act 2-1 is performed upon receipt from wireless terminal 30 of measurements which tend to indicate that the conditions of the source cell $28_S$ have deteriorated and/or the signal from another cell is preferable for the wireless terminal 30 than the signal from the source cell $28_S$. Act 2-2 is performed when the handover unit 50 of the source base station node $26_S$ is handicapped and unable to make an efficacious determination of a target cell for handover, e.g., when the source fell $28_S$ does not have the roaming configuration for the wireless terminal 30 and the attempted handover fails. Act 2-2 comprises the source base station node, and particularly handover unit 50, requesting that a node of the higher layer network (e.g., higher layer note 40) make a handover decision (e.g., determine a target cell, shared by plural public land mobile networks) to which to handover the particular wireless terminal. The source base station node thereby essentially delegates the handover to the higher layer network node and initiates a handover using the S1 interface rather than the X2 interface. Such request for involvement the higher network may take the form of sending the target consultation request message 52, for example.

The handover unit 50 may be handicapped in not being able to select a usable target cell for various reasons. A first reason is that the base station node does not have roaming configuration information for the particular wireless terminal. As explained above, such roaming configuration information is preferably typically received in a handover restriction list (HRL) at initial UE context setup. But in some situation such handover restriction list (HRL) may not be received or exist at the base station node 26. A second reason is that, even if the handover unit 50 has the roaming configuration information (e.g., has a handover restriction list (HRL)) and can make at least a tentative selection of a target cell, neither a serving PLMN nor an equivalent PLMN are supported in the target cell. In this second case the handover fails and thus the selected target cell proves unusable.

Figure 3:
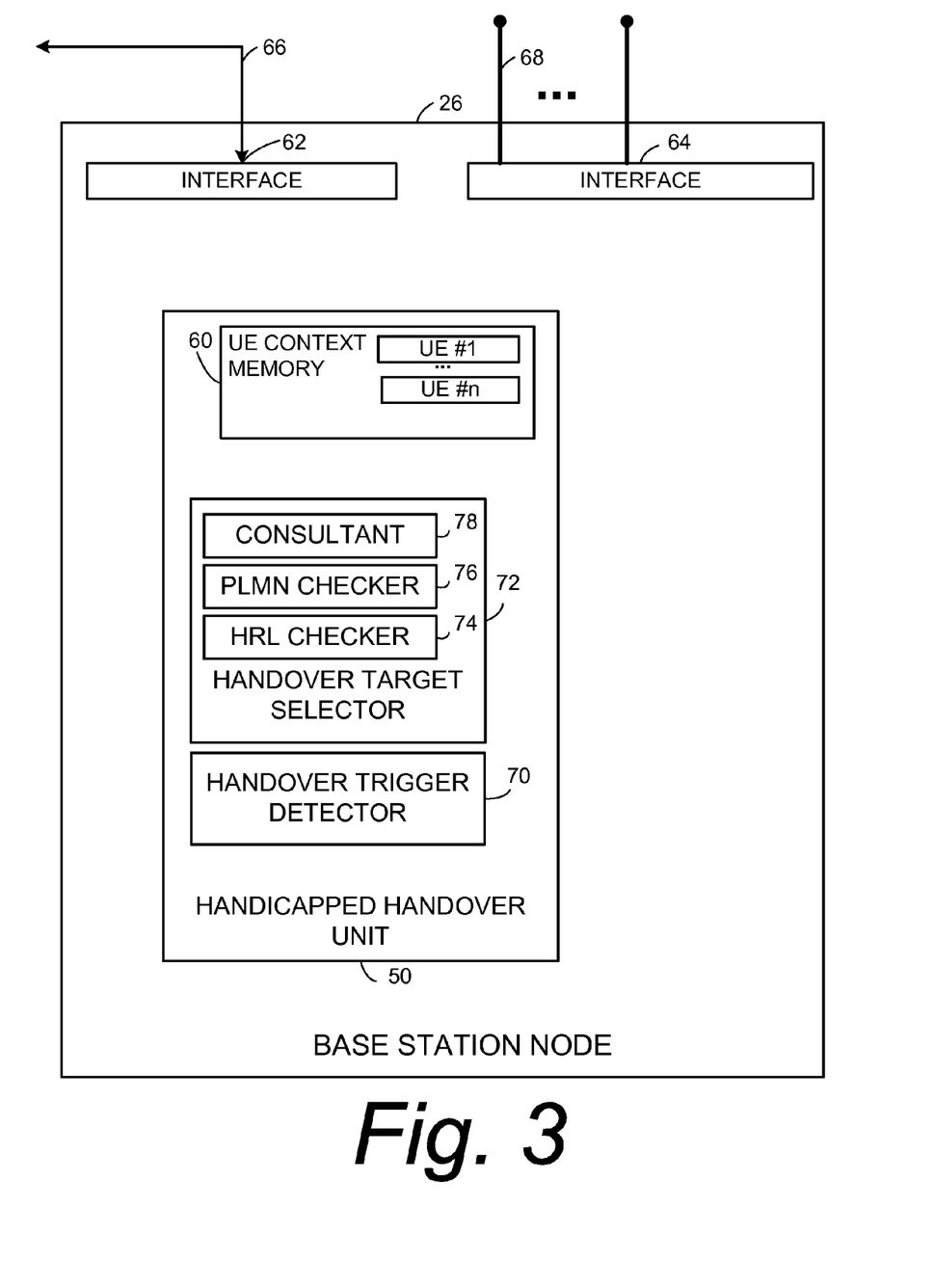
FIG. 3 is a schematic view of a base station node which comprises a handicapped handover unit according to an example embodiment.

FIG. 3 illustrates a base station node 26 which comprises a handicapped handover unit 50 according to an example embodiment. In addition to handover unit 50, the base station node 26 comprises UE context memory 60 and interface units, such as S1 interface unit 62 and radio interface unit 64. The S1 interface unit 62 is connected by hardwire or cable 66 or the like to higher layer network node 40. The base station node 26 communicates using radio interface unit 64 over the radio interface 32. To this end the radio interface unit 64 is shown in FIG. 3 as including one or more antenna 68.

The UE context memory 60 stores a UE context for each wireless terminal for which the base station node 26 serves as a serving base station. As indicated above, the UE context holds subscriber information (downloaded, e.g., from a Home Subscriber Server [HSS]) as well as dynamic information such as a list of bearers that are established and capabilities of the wireless terminal. Preferably a handover restriction list (HRL) is received at initial UE context step, and if so the base station node 26 has criteria for handover to an LTE cell belonging to a shared network. FIG. 3 shows UE context memory 60 as comprising memory locations for plural wireless terminals, e.g., UE #1 through UE #n. But, as mentioned above, in some situations the UE context for a particular wireless terminal may not include a handover restriction list (HRL) for that particular wireless terminal.

FIG. 3 further shows the handover unit 50 as comprising handover trigger detector 70 and handover target selector 72. The handover trigger detector 70 determines that measurements, e.g., measurements from the wireless terminal 30, invite or warrant a handover from the cell served by the base station node to another cell. Alternatively, if a determination is made elsewhere (e.g., by another node), the handover trigger detector 70 detects a communication advising of the need or preference for handover to another cell.

In the example embodiment shown in FIG. 3, handover target selector 72 comprises HRL checker 74; PLMN support checker 76; and consultant unit 78. It will be appreciated that the base station node comprises other functionalities beyond the pertinent functionalities and units herein described.

Figure 4:
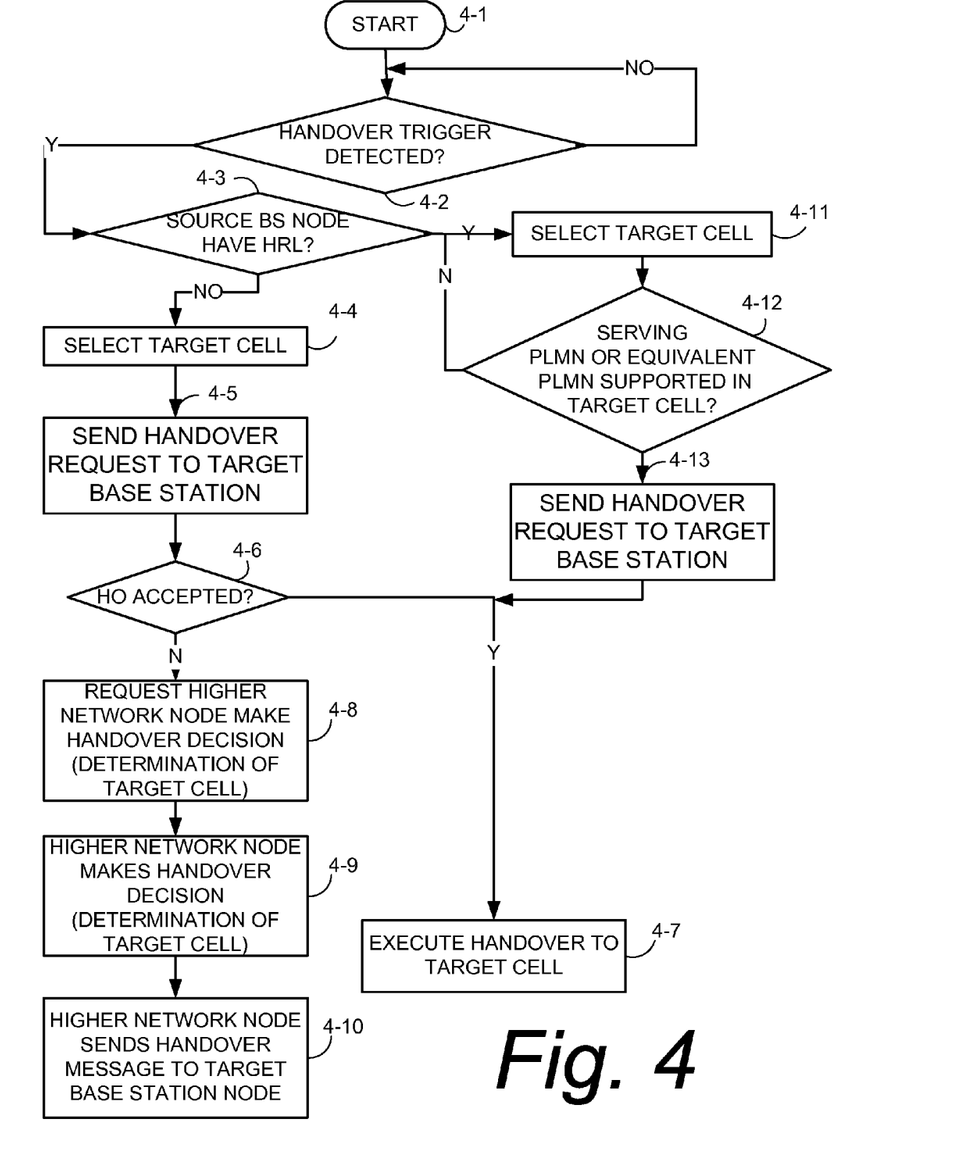
FIG. 4 is a flowchart showing basic, representative acts or steps comprising a method of operating a base station node comprising a handicapped handover unit according to an example mode.

FIG. 4 illustrates, in more detail, basic, representative acts or steps comprising a method of operating a base station node comprising a handicapped handover unit according to an example mode. Act 4-1 reflects start-up or activation of the handover unit 50. Act 4-2 comprises the handover trigger detector 70 determining whether a handover trigger is detected or determined, e.g., whether there is need to handover a particular wireless terminal from the cell currently serving as the serving cell for the wireless terminal to another cell, e.g., a cell for which the wireless terminal has obtained better measurements. If there is no such need, the handover unit 50 continually (e.g., periodically or according to other pre-defined routine) monitors for a handover trigger, as reflected by a loop of execution back to act 4-2.

When need for a handover is detected or determined by handover trigger detector 70 for a particular wireless terminal, as act 4-3 the HRL checker 74 accesses the UE context memory 60 to ascertain whether the source base station node 26 has a handover restriction list (HRL) for the particular terminal in the UE context for that particular terminal. The HRL checker 74 accesses the UE context memory 60 in order to determine if the UE context memory 60 for the particular terminal includes the Handover Restriction List (HRL) for that terminal.

If at act 4-3 the HRL checker 74 ascertains that there is no handover restriction list (HRL) for the terminal, e.g., the wireless terminal (UE) has no restrictions, the source base station node tentatively assumes that an X2 interface handover can be performed to any cell reported by the wireless terminal (UE) node (e.g., any candidate cell reported by the wireless terminal). Accordingly, as act 4-4 the source base station node selects one (e.g., the best) candidate target cell as reported by the wireless terminal to be the selected target cell. Then, as act 4-5, the source base station sends a handover request message to the base station note for the selected target cell. The handover request message to the target base station attempts to initiate an X2 interface handover to the target base station node.

If it is determined at act 4-6 that the attempted X2 interface handover request is accepted or otherwise favorably received by the target base station node, as act 4-7 the handover is executed to the target cell. On the other hand, if the attempted handover fails (e.g., is rejected), the source base station node is notified. Upon receipt of a handover failure notification (reflected by the negative decision branch from act 4-6), as act 4-8 the consultant unit 78 of the source base station node initiates a S1 interface handover by sending the target consultation request 52 to the higher layer network node 40 (in the manner as shown in FIG. 1) to enlist the assistance of the higher layer network node 40 in an S1 handover operation. Upon being invoked in the S1 handover operation, as act 4-9 the higher layer network node 40 makes a handover decision (that the source base station note could not make), e.g., selection of a proper PLMN for a shared target cell. Then, as act 4-10, the higher layer network node 40 sends the handover message 54 to the target base station node in the manner illustrated in FIG. 1. The handover message 54 includes the appropriate PLMN selected by the higher layered network node 40, and may also optionally include the HRL for the wireless terminal for an identifier of the target cell.

Concerning act 4-9, the Mobility Management Entity (MME) in the core network has information that enables the Mobility Management Entity (MME) to select the public land mobile network (PLMN) in the target eNodeB and will include information concerning the selected PLMN in the Handover Request as sent from the Mobility Management Entity (MME) to the target eNodeB. There are many ways in which a Mobility Management Entity[ies] (MME[s]) involved in the UE connection may make a non-access stratum (NAS) selection of PLMN (instead of the NAS selection being performed by the source eNodeB based on, e.g., explicit information such as the information included in a HRL). The MMEs involved in the connection are referred to herein as being for or comprising the 'NAS layer'. The NAS layer needs two types of information in order to make the selection of PLMN. A first type of needed information is the roaming profile that applies to the UE. A second type of information is knowledge of which PLMNs are supported in the target cell.

Regarding the first type of information necessary for making the selection of the PLMN (the roaming profile that applies to the wireless terminal), one possible solution is that the Mobility Management Entity (MME) may contain configured information in the form of, e.g., a list of PLMNs in which a particular UE might roam. This can be configured per IMSI series or something similar. Another possible solution is that MME acquires the information from subscriber data in the HLR/VLR associated to the exact IMSI of the wireless terminal (UE). Other solutions are also possible.

Regarding the second type of information necessary for making the selection of the PLMN, it should be understood that the "NAS layer" may comprise a source MME and a target MME. The target MME is connected over the S1 interface to the target cell. The target MME is in control of the Served PLMN(s) for which the eNodeB that controls the target cell has been configured. In case of a multi-operator core network (MOCN), the eNodeB might have additional S1 connections to other MMEs. For present purposes it is sufficient to understand that target MME knows the served PLMNs in the target cell, and that this information can be transferred to the source MME.

Should it be determined as act 4-3 that the source base station node does have an HRL for the wireless terminal, as act 4-11 the source base station node selects one (e.g., a best) candidate target cell as reported by the wireless terminal to be a selected target cell. Of course, the selected target cell cannot be a cell listed on the Handover Restriction List (HRL) for the wireless terminal. Then, as act 4-12, the PLMN support checker 76 determines whether the serving PLMN or an equivalent PLMN is supported by the selected target cell. If the PLMN support checker 76 cannot determine that the serving PLMN or an equivalent PLMN is not supported by the target cell, the target cell is ignored as a candidate for the handover, as reflected by the fact that execution may return to act 4-11 where, e.g., another candidate cell reported by the wireless terminal may be evaluated for the target cell). Otherwise, the source base station node sends the handover request to the target base station node (see act 4-13) which, if successfully received and accepted by the target base station node, culminates in execution of handover to the target cell (act 4-7).

Concerning act 4-12, the PLMN support checker 76 may determine whether the serving PLMN or an equivalent PLMN is supported by the target cell by consulting information (which indicates whether a PLMN is supported for a neighbor cell) which may be either manually configured or configured by a self organizing network (SON).

The method of FIG. 4 thus encompasses various possible scenarios or embodiments, two of which are briefly mentioned below. In each example scenario or embodiment a S1 handover is triggered rather than an X2 handover. By "S1 handover" is meant a handover over the S1 interface involving the higher layer network, e.g., a higher layer network node. The higher layer network node may be, for example, a mobility management entity (MME), as described above. By contrast, an "X2 handover" is a handover over the X2 interface.

Figure 5:
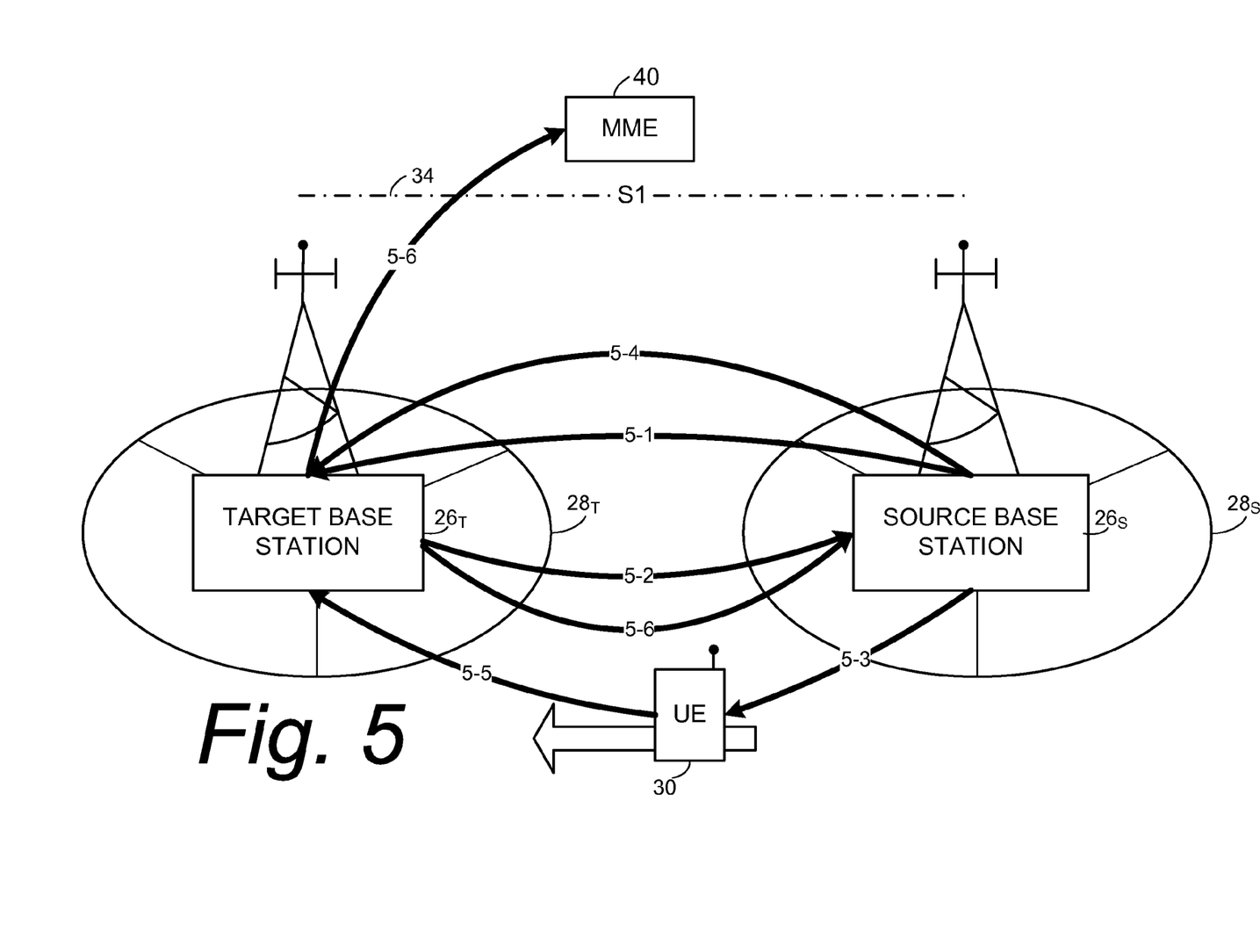
FIG. 5 is a diagrammatic view showing an example X2 handover, and particularly an alternative for Intra-LTE Inter-eNodeB Handover which can be used when there is no need to change an MME pool.

FIG. 5 illustrates a typical X2 handover. In the example handover scenario of FIG. 5, act 5-1 depicts a handover request message sent from the source eNodeB to the target eNodeB. Act 5-2 shows a handover response message returned by the target eNodeB to the source eNodeB. Act 5-3 represents a handover command sent from the source eNodeB to the wireless terminal. Act 5-4 is a "start packet forwarding" message sent from the source eNodeB to the target eNodeB. Act 5-5 depicts a "handover complete" message which is sent by the wireless terminal to the target eNodeB. Act 5-6 shows a "handover complete" message sent from the target eNodeB to the Mobility Management Entity (MME). Lastly, act 5-7 represents a "release old resources" message sent from the target eNodeB to the source eNodeB.

Figure 6:
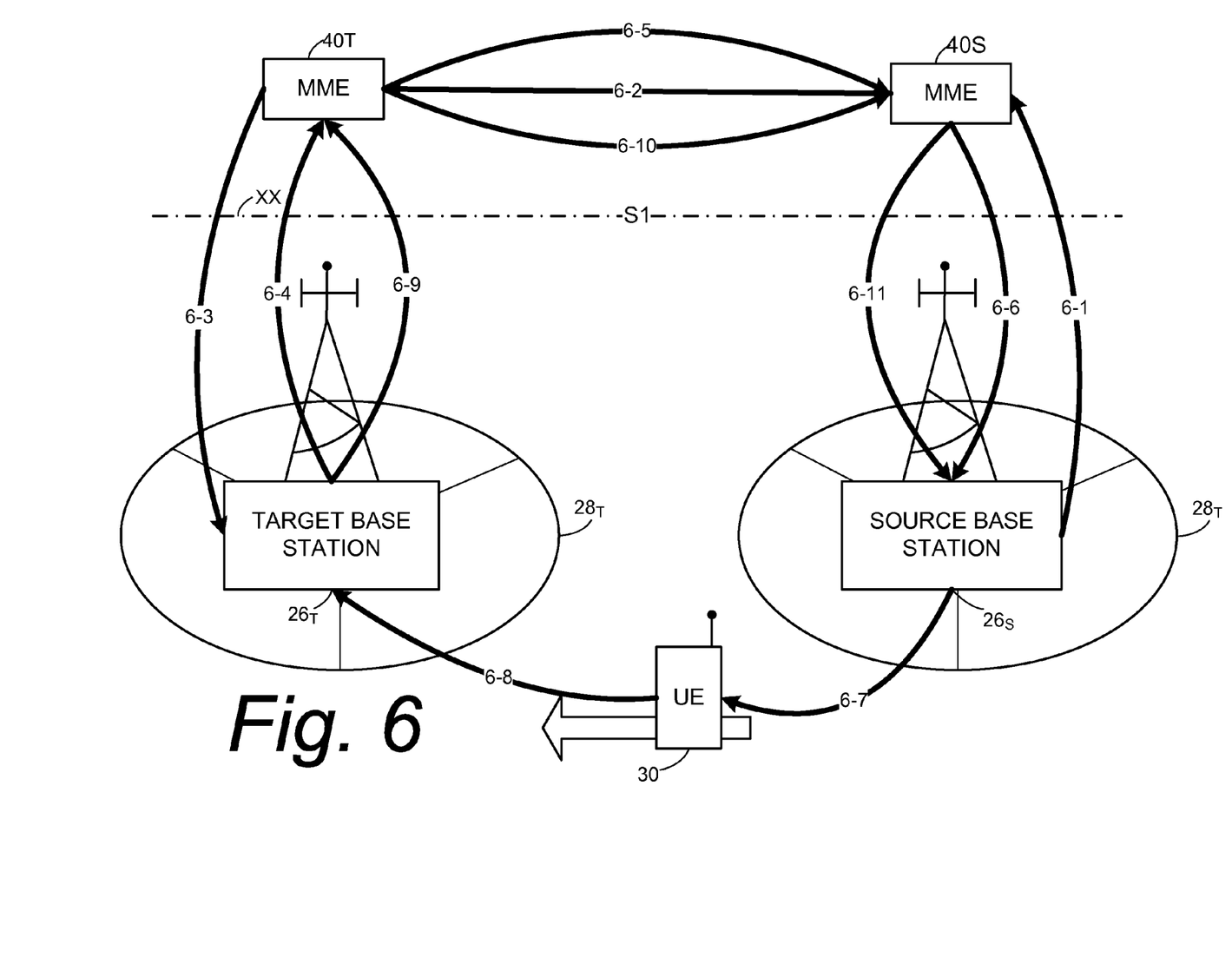
FIG. 6 is a diagrammatic view showing an example S handover, and particularly an alternative for Intra-LTE Inter-eNodeB Handover involving MME which can be used regardless of whether or not there is a need to change MME pool.

FIG. 6 shows that the MME is not involved in a handover over the X2 interface, but rather all communications are performed between base station nodes, e.g. between a source base station node and a target base station node. When the X2 interface handover is complete, the Mobility Management Entity (MME) is informed by an appropriate message (e.g., pathSwitchRequest) as depicted by act 5-6.

First Example Scenario/Embodiment

In a first example embodiment and scenario, the source eNodeB triggers S1 handover rather than X2 handover if:
The target cell is shared and supports more than one PLMN;
The source eNodeB has not previously received a message containing the Handover Restriction List IE;
The current PLMN is not supported in the target cell; and
The PLMN to be used cannot be determined otherwise (e.g. if an IMS Emergency Call then OK to select the X2 interface handover.

Second Example Scenario/Embodiment

In a second example embodiment and scenario the source eNodeB triggers S1 handover rather than X2 handover if:
The target cell is shared and supports more than one PLMN;
The source eNodeB has not previously received a message containing the Handover Restriction List IE;
The current PLMN is supported in the target cell; and
The PLMN to be used cannot be determined otherwise (e.g. if IMS Emergency Call then OK to select the X2 interface handover).

Figure 7:
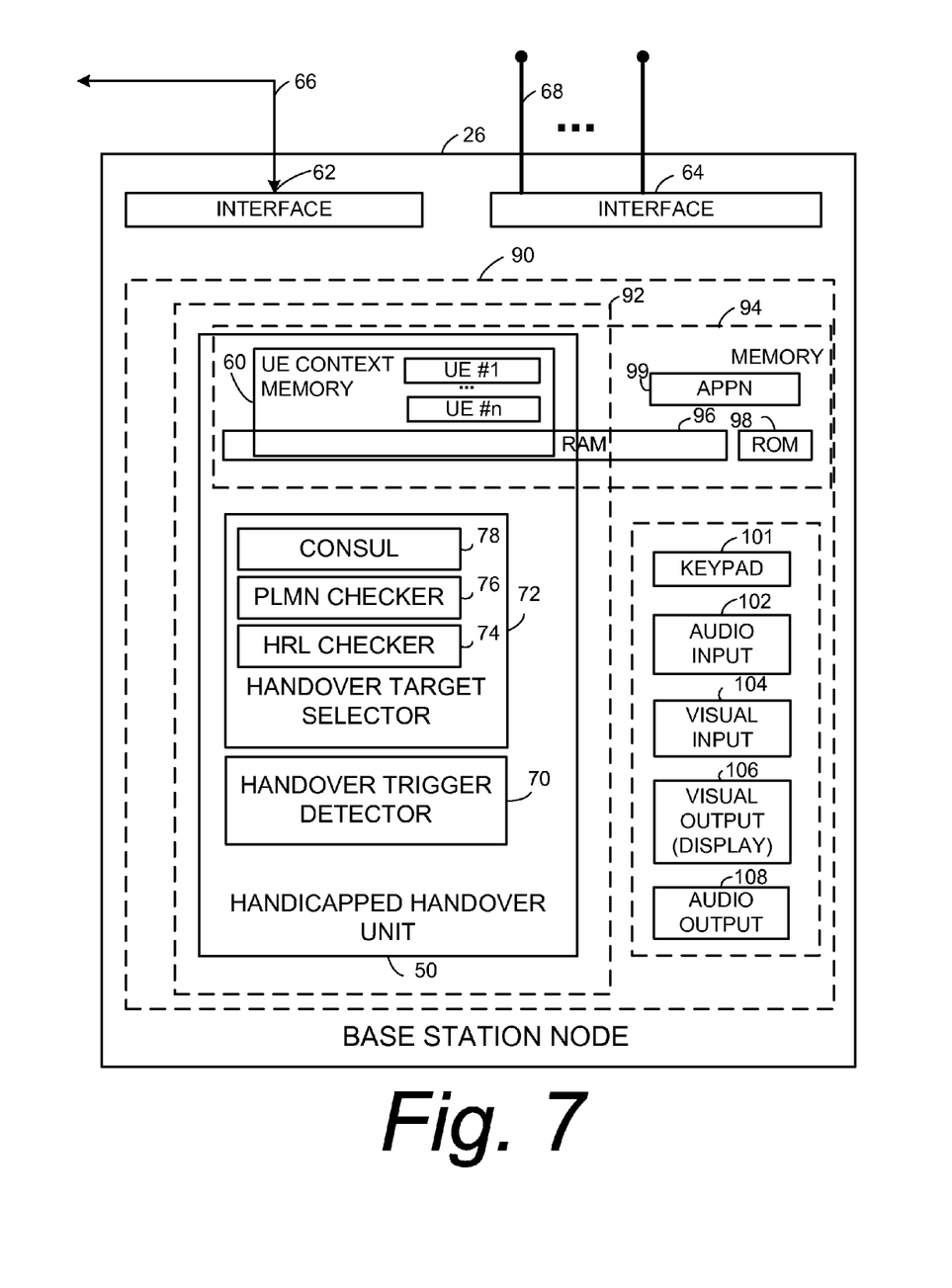
FIG. 7 is a schematic view of a base station node which comprises a handicapped handover unit realized at least in part by a machine platform according to an example embodiment.

FIG. 6 shows an S1 handover, and particularly an S1 alternative for intra-LTE, inter-eNodeB handover involving a Mobility Management Entity (MME). FIG. 6 shows a higher layer network having both a source MME 40S and a target MME 40T. Act 6-1 depicts a "handover required" message sent from the source eNodeB to the source MME 40S. Act 6-2 represents a "forward relocation request" message sent from the source MME 40S to the target MME 40T. The target MME 40T then sends, as act 6-3, a "handover request" message to the target eNodeB. The target eNodeB response as act 6-4 with a "handover response" message to the target MME. In response, the target MME as act 6-5 sends a "forward relocation response" message to the source MME. Then, as act 6-6, the source MME sends a "handover command" to the source eNodeB. As act 6-7 the source eNodeB sends a "handover command" message to the wireless terminal. The wireless terminal subsequently, as act 6-8, sends a "handover complete" message to the target node B. Then, as act 6-9 the target eNodeB sends a "handover complete" message to the target MME. The target MME sends a "relocation complete/update user plane route" message to the source MME. At this point the source MME sends a "release all resources" message to the source eNodeB. FIG. 7 illustrates more structural detail for certain example embodiments of base station node 26 and of the handover unit 50. For example FIG. 7 illustrates that handover unit 50 can be provided on a machine platform 90. The terminology "platform" is a way of describing how the functional units of base station node 26 can be implemented or realized by machine, such as electronic circuitry in the form of a computer(s) or hardware circuit. One example platform 90 is a computer implementation wherein one or more of the framed elements are realized by one or more processors 92 which execute coded, non-transitory instructions in order to perform the various acts described herein. In such a computer implementation the mobile station 30 can comprise, in addition to a processor(s) 92, memory section 94 (which in turn can comprise random access memory 96; read only memory 98; application memory 99 (which stores, e.g., coded instructions which can be executed by the processor to perform acts described herein); and any other memory such as cache memory, for example).

Typically the base station node 26 also comprises other input/output units or functionalities, the representative input/output units for base station node 26 being illustrated in FIG. 7 as keypad 101; audio input device (e.g. microphone) 102; visual input device (e.g., camera) 104; visual output device (e.g., visual display unit 106); and audio output device (e.g., speaker) 108. Other types of input/output devices can also be connected to or comprise the base station node 26.

In the example of FIG. 7 the platform 90 has been illustrated as computer-implemented or computer-based platforms. Another example platform suitable for base station node 26 and its handover unit 50 is that of a hardware circuit, e.g., an application specific integrated circuit (ASIC) wherein circuit elements are structured and operated to perform the various acts described herein.

Thus, in one of its aspects the technology disclosed herein uses the availability of handover restriction information (e.g., a handover restriction list (HRL) in a source base station node for a particular wireless terminal) as critiera for determining whether to administer a handover with or without consultation of a higher layer network, e.g., a higher layer network node 40 such as a mobility management entity (MME). In the case when the base station node (e.g., eNodeB) has not received a HRL at Initial UE context setup and the criterions for Handover to an LTE cell belonging to a shared network is fulfilled, as described herein the ENodeB chooses to use the S1 handover instead of an X2 handover.

Advantages of the technology disclosed herein include moving responsibility for selecting a PLMN from the radio access network to a higher layer network (e.g., to a core network, and in some example embodiments to a mobility management entity (MME)). As such, the risk for handover rejection due to faulty PLMN selection is reduced.

Abbreviations

The following is an explanation of certain abbreviations that may be utilized herein:
HRL Handover Restriction List
IE Information Element
LAI Location Area Identity
LTE Long Term Evolution
UE User Equipment
PLMN Public Land Mobile Network
RAT Radio Access Technology
TAI Tracking Area Identity References The following documents/information are references denoted herein as "ref", each of which are incorporated herein by reference in their entirety:
[1] 3GPP TS 36.413: Evolved Universal Terrestrial Radio Access Network (E-UTRAN); S1 Application Protocol (S1AP)
[2] 3GPP TS 36.423: Evolved Universal Terrestrial Radio Access Network (E-UTRAN); X2 Application Protocol (X2AP)
[3] 3GPP TS 23.251: Network sharing; Architecture and functional description
[4] 3GPP TS 24.008: Mobile radio interface Layer 3 specification; Core network protocols; Stage 3
[4] 3GPP TS 25.331: Radio Resource Control (RRC); Protocol specification
[5] 3GPP TS 36.331: E-UTRA; Radio Resource Control (RRC); Protocol specification Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1

HANDOVER RESTRICTION LIST
(as shown in 3GPP TS 36.413, clause 9.2.1.22, and in 3GPP TS 36.423, clause 9.2.3)

| IE/Group Name | Presence | Range | IE type and reference | Semantics description |
|---|---|---|---|---|
| Serving PLMN | M | | OCTET STRING(3) | |
| Equivalent PLMNs | | 0 ... <maxnoofEPLMNs> | | Allowed PLMNs in addition to Serving PLMN. This list corresponds to the list of "equivalent PLMNs" as defined in [TS 24.008]. |
| >PLMN Identity | M | | OCTET STRING(3) | |
| Forbidden TAIs | | 0 ... <maxnoofEPLMNs PlusOne> | | intra LTE roaming restrictions |
| >PLMN Identity | M | | OCTET STRING(3) | The PLMN of forbidden TACs |
| >Forbidden TACs | | 1 ... <maxnoofForbTACs> | | |
| >>TAC | M | | OCTET STRING(2) | The TAC of the forbidden TAI |
| Forbidden LAIs | | 0 ... <maxnoofEPLMNs PlusOne> | | inter-3GPP RAT roaming restrictions |
| >PLMN Identity | M | | OCTET STRING(3) | |
| >Forbidden LACs | | 1 ... <maxnoofForbLACs> | | |
| >>LAC | M | | OCTET STRING(2) | |
| Forbidden inter RATs | O | | ENUMERATED(ALL, GERAN, UTRAN, CDMA2000, ..., GERAN and UTRAN, CDMA2000 and UTRAN) | inter-3GPP and 3GPP2 RAT access restrictions |

What is claimed is:

1. A base station node of a radio access network comprising:
a communication interface to a higher layer network node;
a handover unit configured to request that the higher layer network node make a decision regarding a target cell to which to handover a particular wireless terminal when the base station node does not have roaming configuration information for the particular wireless terminal, the target cell being shared by plural public land mobile networks; and wherein the handover unit is configured:
to determine whether there is a handover restriction list (HRL) for the particular wireless terminal;
when there is no handover restriction list (HRL) for the particular wireless terminal, to request that the higher layer network node make a selection of one of the plural public land mobile networks for the target cell.

2. The base station node of claim 1, further comprising:
a memory configured to store UE contexts for plural user wireless terminals;
a checker configured to determine whether the memory has stored therein a handover restriction list for the particular user.

3. The base station node of claim 1, wherein the communication interface facilitates communication over an S1 interface with a core network and wherein the handover unit is configured to request that a mobility management entity (MME) of the core network make the decision.

4. The base station node of claim 1, wherein the handover unit is comprised of electronic circuitry.

5. The base station node of claim 1, wherein the handover unit is configured:
when there is no handover restriction list (HRL) for the particular wireless terminal, to make an attempted X2 interface handover of the particular wireless terminal; and,
when the attempted X2 interface handover of the particular wireless terminal fails, to request that the higher layer network node make a selection of one of the plural public land mobile networks for the target cell.

6. A method of operating a communications network comprising a radio access network and a higher layer network, the radio access network comprising a source base station node, the method comprising:
determining a need of a handover for a particular wireless terminal from a cell served by the source base station to another cell;
when there is no handover restriction list (HRL) for the particular wireless terminal, the source base station node requesting that a node of the higher layer network make a decision regarding a target cell including a selection of one of the plural public land mobile networks for the target cell to which to handover the particular wireless terminal when the source base station node does not have roaming configuration information for the particular wireless terminal, the target cell being shared by plural public land mobile networks (PLMNs).

7. The method of claim 6, further comprising:
the source base station node determining that the source base station node does not have roaming configuration information for the particular wireless terminal.

8. The method of claim 7, further comprising the higher layer network node providing the target station node for the target cell with a Handover Restriction List (HRL) for the particular wireless.

9. The method of claim 6, further comprising the higher layer network node performing S1 interface handover to the target cell.

10. The method of claim 6, further comprising:
the source base station node storing UE contexts for plural user wireless Terminals in a memory; and
the source base station node checking whether the memory has stored therein a handover restriction list for the particular user wireless terminal.

11. The method of claim 6, further comprising the source base station node requesting that a mobility management entity (MME) make the decision.

12. The method of claim 6, further comprising:
when there is no handover restriction list (HRL) for the particular wireless terminal, the source base station requesting an attempted X2 interface handover of the particular wireless terminal; and,
when the attempted X2 interface handover of the particular wireless terminal fails, the source base station requesting that the higher layer network node make a selection of one of the plural public land mobile networks for the target cell.

* * * * *

UNITED STATES PATENT AND TRADEMARK OFFICE
CERTIFICATE OF CORRECTION

PATENT NO. : 9,002,361 B2
APPLICATION NO. : 13/180279
DATED : April 7, 2015
INVENTOR(S) : Bergquist et al.

It is certified that error appears in the above-identified patent and that said Letters Patent is hereby corrected as shown below:

In the specification

In Column 1, Lines 27-28, delete "user equipment units (UE)" and insert -- user equipment units (UEs) --, therefor.

In Column 2, Line 2, delete "S1AP" and insert -- S1AP. --, therefor.

In Column 2, Line 28, delete "and interface" and insert -- an interface --, therefor In Column 2, Line 39, delete "networks (PLMN)," and insert -- networks (PLMNs), --, therefor.

In Column 2, Line 47, delete "setup" and insert -- setup. --, therefor.

In Column 3, Line 1, delete "HLR" and insert -- HRL --, therefor.

In Column 4, Line 6, delete "base station note)." and insert -- base station node). --, therefor.

In Column 4, Lines 45-46, delete "base station note" and insert -- base station node --, therefor.

In Column 4, Line 55, delete "base station note" and insert -- base station node --, therefor.

In Column 8, Line 18, delete "networks (PLMN)," and insert -- networks (PLMNs), --, therefor.

In Column 9, Line 23, delete "layer note 40)" and insert -- layer node 40) --, therefor.

In Column 10, Line 53, delete "base station note" and insert -- base station node --, therefor.

In Column 11, Line 4, delete "base station note" and insert -- base station node --, therefor.

Signed and Sealed this
Sixth Day of October, 2015

Michelle K. Lee
*Director of the United States Patent and Trademark Office*

CERTIFICATE OF CORRECTION (continued)
U.S. Pat. No. 9,002,361 B2

In Column 13, Line 63, delete "critiera" and insert -- criteria --, therefor.

In the claims

In Column 16, Line 61, in Claim 10, delete "wireless Terminals" and insert -- wireless terminals --, therefor.